United States Patent Office 3,213,074
Patented Oct. 19, 1965

3,213,074
SHORTSTOPPING ORGANOMETALLIC-TYPE BUTADIENE POLYMERIZATIONS WITH AZIRIDINYL PHOSPHINE OXIDES OR SULFIDES
Henry L. Hsieh, Bartlesville, Okla., assignor to Phillips Petroleum Company, a corporation of Delaware
No Drawing. Filed July 9, 1962, Ser. No. 208,622
7 Claims. (Cl. 260—94.3)

This invention relates to a method for terminating the polymerization of 1,3-butadiene by inactivating the catalyst. In another aspect of the invention, a method is provided for terminating a butadiene polymerization so that the resulting product has an improved color. In a further aspect, the invention relates to the improved cis-polybutadiene product which results from the method of terminating the polymerization.

There has been conducted in recent years a great deal of research work directed toward the production of improved rubbery polymers. Great advances have recently been made in this field as a result of the discovery of new catalyst systems. These catalyst systems are often described as being "stereospecific" since they are capable of polymerizing monomers, particularly conjugated dienes, to a certain geometric configuration. One of the products which has attracted widespread attention because of its outstanding and superior properties is a polybutadiene containing a high percentage, e.g. at least 85 percent, of cis 1,4-addition. The physical properties of this high cis-polybutadiene are of such a nature that the polymer is particularly suitable for the fabrication of heavy duty tires and other articles for which conventional synthetic rubbers have heretofore been comparatively unsatisfactory. When using conventional methods to terminate the polymerization reaction in which cis-polybutadiene is produced, the product has a dark yellow or amber color. It would be very desirable for many applications if a substantially colorless product could be produced.

It is an object of this invention, therefore, to provide a method for terminating the polymerization of 1,3-butadiene so as to obtain a product having improved color.

Another object of the invention is to provide a method of shortstopping a butadiene polymerization which employs a catalyst containing an organometal compound and an iodine-containing component.

Still another object of the invention is to provide a cis-polybutadiene which has an improved color.

Other objects and advantages of the invention will become apparent to those skilled in the art on consideration of the accompanying disclosure.

The present invention is concerned with an improvement in the process for polymerizing 1,3-butadiene in the presence of a catalyst system which is obtained by reacting materials including an organometal and iodine, either in the free or combined state. The improvement comprises the step of adding to the polymerization mixture a minor amount of a compound containing at least one aziridinyl group in order to inactivate the catalyst and terminate the reaction. When polymerizing butadiene with an organometallic-type catalyst, the reaction is normally terminated or shortstopped when the conversion has reached the desired level by addition to the polymerization of a catalyst-inactivating agent. Compounds that have been used in this manner include materials such as water, alcohols and rosin acids. While these materials are effective shortstopping agents, the products produced generally have a dark yellow or amber color. Even though the color has no significant effect on most polymer properties, it is a serious disadvantage for certain applications where colorless products are desired. It was completely unexpected when it was found that compounds containing at least one aziridinyl group were not only effective as shortstopping agents but additionally functioned to improve the color of the product. Thus, by proceeding in accordance with the present invention, substantially colorless, rubbery products of cis-polybutadiene having Mooney values in the range of about 10–60 (ML–4 at 212° F.) can be readily produced.

The shortstopping agents of this invention are compounds containing at least one, preferably two or more, aziridinyl groups. The aziridinyl groups can be represented by the following formula:

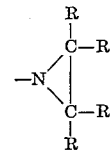

wherein each R is selected from the group consisting of hydrogen, alkyl, aryl, and cycloalkyl radicals and composites of these hydrocarbon radicals, such as aralkyl, alkaryl, cycloalkylaryl, cycloalkylalkyl, arylcycloalkyl, alkylcycloalkyl, and the like, and the total of the R groups contains up to and including 20 carbon atoms. The aziridinyl group as above defined can be attached to hydrogen, and it can also be attached to a carbon, phosphorous or sulfur atom in the compound. Furthermore, more than one aziridinyl group can be attached to the same carbon, phosphorous or sulfur atom. These carbon, phosphorous or sulfur atoms are, in turn, doubly bonded to another atom. The sulfur is attached to oxygen through a double bond, and the carbon or phosporous is doubly bonded to an oxygen, sulfur, or nitrogen atom. These carbon, phosphorous, or sulfur atoms can also be attached to another aziridinyl group and/or other atoms in the compound which can with the phosphorous or carbon atom form a cyclic compound, such as, for example, the triazines and triphosphatriazines.

Examples of the types of aziridinyl compounds that can be used are the mono-, di-, and tri(aziridinyl) phosphine oxides or sulfides; mono-, di-, and triaziridinyl-substituted triazines; mono-, di-, tri-, tetra-, penta-, and hexaaziridinyl-substituted triphosphatriazines; and compounds containing aziridinyl-substituted carbonyl, sulfinyl

or sulfonyl

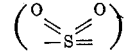

groups, such as diamides and disulfonamides in which the nitrogen is a member of the aziridinyl ring. Examples of specific compounds which illustrate the type of compounds which can be employed as shortstopping agents include: tri(1-aziridinyl) phosphine oxide, tri(2-methyl-1-aziridinyl)phosphine oxide, tri(2-methyl-3-ethyl - 1 - aziridinyl)phosphine oxide, tri(2-ethyl-3-decyl-1-aziridinyl)phosphine oxide, tri(2 - eicosyl - 1 - aziridinyl) phosphine oxide, tri(2-methyl-3-cyclopentyl-1-aziridinyl) phosphine oxide, tri(2-phenyl-1-aziridinyl)phosphine oxide, tri[2-ethyl-3-(1-naphthyl)1-aziridinyl]phosphine oxide, tri(2-nonyl-3-benzyl-1-aziridinyl)phosphine oxide, tri[2 - n - propyl-3-(2-phenylethyl)1-aziridinyl]phosphine oxide, tri[2-heptyl-3-(2,4 - dimethylphenyl)-1-aziridinyl] phosphine oxide, tri(2-methyl-1-aziridinyl)phosphine sulfide, tri(2-methyl-3-cyclohexyl-1-aziridinyl)phosphine sulfide, tri(2-phenyl-1-aziridinyl)phosphine sulfide, tri(2-amyl-3-benzyl-1-aziridinyl)phosphine sulfide, phenyl-bis(2-methyl-1-aziridinyl)phosphine sulfide, phenyl-bis(2-methyl-1-aziridinyl)phosphine oxide, phenyl-bis(2-methyl-3-ethyl-1-aziridinyl)phosphine oxide, bis(2-methyl-1-aziridinyl)sulfoxide, bis(2-propyl-1-aziridinyl)sulfoxide, bis (1 - aziridinyl)sulfone, bis(2-propyl-1-aziridinyl)sulfone, bis-(1,2-propylene)-1,3-urea, bis(4,5-octylene)-1,3-urea, tri(2,2-dimethyl-1-aziridinyl)phosphine oxide, tri(2,2,3,3-tetraethyl-1-aziridinyl)phosphine oxide, tri(2,2-dimethyl-3-ethyl-1-aziridinyl)phosphine oxide, N,N-dioctyl amino-bis(2,2-dimethyl-1-aziridinyl)phosphine oxide, N,N-diphenylamino - bis(2,2-di-n-propyl-1-aziridinyl)phosphine sulfide, tri(2,2-dimethyl-1-aziridinyl)phosphine sulfide, n-butoxy-bis(1-aziridinyl)phosphine oxide, N-pentamethylene-bis(2-methyl-2-phenyl-1-aziridinyl)phosphine sulfide, 2,4,6-tri(1 - aziridinyl)1,3,5-triazine, 2,4,6-tri(2-methyl-1-aziridinyl)1,3,5-triazine, 2,4,6-tri(2-methyl-3-ethyl-1-aziridinyl)1,3,5-triazine, 2,4,6 - tri(2-ethyl-3-octadecyl-1-aziridinyl)1,3,5 - triazine, 2,4,6-tri(2-methyl-3-cyclopentyl-1-aziridinyl)1,3,5 - triazine, 2,4,6-tri(2-phenyl-1-aziridinyl) 1,3,5-triazine, 2,4,6-tri(2,3-diphenyl-1-aziridinyl)1,3,5-triazine, 2,4,6-tri(2-n-propyl-3-(2-phenylethyl)1-aziridinyl) 1,3,5-triazine, 2,4,6-tri(2-methyl-3-(4-methylphenyl)1-aziridinyl)1,3,5-triazine, 2-cyclohexyl-4,6-bis(2,2-dimethyl-1-aziridinyl)1,3,5 - triazine, 2,4,6 - tri(1-aziridinyl)2,4,6-triphospha-1,3,5-triazine, 2,4,6-tri(2-methyl-3-n-butyl-1-aziridinyl)2,4,6-triphospha-1,3,5-triazine, 2,4,6-tri(2-ethyl-3-cyclohexyl - 1 - aziridinyl)2,4,6 - triphospha-1,3,5-triazine, 2,4,6 - tri[2-n-propyl-3-(2-phenylethyl)1-aziridinyl]2,4,6-triphospha-1,3,5-triazine, 2,4,6-tri[2-heptyl-3-(2,4-dimethylphenyl)1-aziridinyl]2,4,6-triphospha-1,3,5-triazine, 2,2,4,4,6,6-hexa(2-methyl-1-aziridinyl)2,4,6-triphospha-1,3,5-triazine, 2,2,4,6 - tetra(2-hexyl-1-aziridinyl)2,4,6-triphospha1,3,5-triazine, 2-benzyl-4,6-bis(2,2,3-triethyl-1-aziridinyl)2,4,6-triphospha-1,3,5-triazine, ethylene glyclo bis (1,2-propylene)-carboxamide, ethylene glycol bis(2,3-butylene)-carboxamide, diethylene glycol bis(1,2-ethylene)-carboxamide, bis(1,2-propylene)adipamide, bis(2,2-dimethylethylene)adipamide, bis(1,2-propylene)benzene-m-disulfonamide, bis(2,2,3-tri-n-propylethylene)benzene-m-disulfonamide, bis(1,2-propylene)terephthalamide, and the like.

The shortstopping agents of this invention are applicable to the polymerization reactions in which butadiene is polymerized with organometal type catalysts. In a preferred embodiment, the shortstopping agents are utilized in a polymerization process in which butadiene is contacted with a catalyst system obtained by reacting materials comprising an organometal and an iodine-containing component. The polybutadiene products obtained in this polymerization contain a high percentage of cis 1,4-addition, for example, from 85 to 98 percent and higher. These high cis-polybutadienes can be prepared by polymerizing 1,3-butadiene with any one of a large number of different stereospecific catalysts.

The shortstopping agents of this invention are particularly applicable to processes for polymerizing butadiene with a catalyst which is selected from the group consisting of (1) a catalyst comprising an organometal compound having the formula $R_mM$, wherein R is alkyl, cycloalkyl, aryl, alkaryl, aralkyl, alkylcycloalkyl or cycloalkylalkyl, M is aluminum, mercury, zinc, beryllium, cadmium or magnesium, and $m$ is equal to the valence of the metal M and titanium tetraiodide, (2) a catalyst comprising an organometal compound having the formula $R_nM'$, wherein R is an organo radical as defined above, M' is aluminum, magnesium or lead, and $n$ is equal to the valence of the metal M', titanium tetrachloride and titanium tetraiodide, (3) a catalyst comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{iv}I_c$, wherein is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst comprising an organo compound having the formula $R_xM'''$, wherein R, M''', and $x$ are as defined above, titanium tetraiodide, and an inorganic halide having the formula $M^vX_d$, wherein $M^v$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene; triisobutylaluminum and titanium tetraiodide; triethylaluminum and titanium tetraiodide; triisobutylaluminum, titanium tetrachloride, and titanium tetraiodide; triethylaluminum; titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri-alpha-naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; dimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride and antimony triiodide; triisobutylaluminum, titanium tetrachloride and aluminum triiodide; triisobutylaluminum, titanium tetrabromide, and aluminum triiodide; triethylaluminum, titanium tetrachloride, and phosphorous triiodide; tri-n-dodecyclaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetrachloride, and tin tetrabromide; triethylgallium, titanium tetraiodide, and aluminum tribromide; triethylaluminum, titanium tetraiodide, and arsenic trichloride; and tribenzylalumium, titanium tetraiodide, and germanium tetrachloride.

The polymerization process for preparing cis-polybutadiene is carried out in the presence of a hydrocarbon diluent which is not deleterious to the catalyst system. Examples of suitable diluents include aromatic, paraffinic, and cycloparaffinic hydrocarbons, it being understood that mixtures of these materials can also be used. Specific examples of hydrocarbon diluents include benzene, toluene, n-butane, isobutane, n-pentane, isooctane, n-dodecane, cyclopentane, cyclohexane, methylcyclohexane, and the like. It is often preferred to employ aromatic hydrocarbons as the diluent.

The amount of the catalyst used in preparing the cis-polybutadiene product can vary over a rather wide range. The amount of the organometal used in the catalyst composition is usually in the range of 1.0 to 20 mols per mol of the halogen-containing component, i.e., a metal halide with or without a second metal halide or elemental iodine. However, a preferred mol ratio is from 2.5:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodine is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount of 1,3-butadiene charged to the reactor system.

The process for preparing cis-polybutadiene can be carried out at temperatures varying over a rather wide range, e.g., from −100 to 250° F. It is usually preferred to operate at a temperature in the range of −30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

Various materials are known to be detrimental to the catalyst employed in preparing the high cis-polybutadiene. These materials include carbon dioxide, oxygen and water. It is usually desirable, therefore, that the butadiene and diluent be free of these materials as well as other materials which may tend to inactivate the catalyst. Furthermore, it is desirable to remove air and moisture from the reaction vessel in which the polymerization is to be conducted.

Upon completion of the polymerization reaction, the reaction mixture is then treated to inactivate the catalyst and recover the rubbery polymer. According to the present invention, the catalyst is inactivated by adding to the reaction mixture a compound containing at least one aziridinyl group as described hereinbefore. The amount of shortstopping agent employed is usually in the range of 0.01 to 1 part by weight per 100 parts by weight of the rubber. It is usually preferred to use an amount in the range of 0.15 to 0.07 part by weight per 100 parts by weight of rubber. After the shortstopping agent has been added at the conclusion of the polymerization, the polymer is recovered by conventional methods such as steam stripping, alcohol coagulation, and the like.

A more comprehensive understanding of the invention can be obtained by referring to the following illustrative example which is not intended, however, to be unduly limitative of the invention.

*Example*

Two aziridinyl compounds, tri(2-methyl-1-aziridinyl) phosphine oxide and tri(2-methyl-1-aziridinyl)phosphine sulfide, were employed as shortstopping agents in systems for the polymerization of butadiene in the presence of a catalyst comprising triisobutylaluminum, titanium tetrachloride and elemental iodine. The following polymerization recipe was used:

| | |
|---|---:|
| 1,3-butadiene, parts by weight | 100 |
| Toluene, parts by weight | 1100 |
| Triisobutylaluminum, mhm.[1] | 3 |
| Iodine, mhm.[1] | 0.85 |
| Titanium tetrachloride, mhm.[1] | 0.49 |
| Temperature, °F. | 41 |
| Time, hours | 16 |
| Conversion, percent | 100 |

[1] Millimoles per 100 parts monomer.

Toluene was charged first, after which the reactor was purged with nitrogen. Butadiene was then added, followed by the triisobutylaluminum, iodine, and titanium tetrachloride in the order named. Two pairs of runs were made. At the close of the reaction period, one run from each pair was shortstopped with isopropyl alcohol and used as a control. One of the remaining runs was shortstopped with 0.2 part by weight per 100 parts rubber of tri(2-methyl-1-aziridinyl)phosphine oxide and the other with the same amount of tri(2-methyl-1-aziridinyl)phosphine sulfide. After shortstopping, the polymers were coagulated with isopropyl alcohol and separated. Thereafter, 0.5 part by weight per 100 parts rubber of the antioxidant 2,2' - methylene-bis(4-methyl-6-tert-butylphenol) was incorporated into the wet polymer, and the products were dried. Following are the results of ratings on polymer color:

| Run No. | Shortstopping Agent | Polymer Color |
|---|---|---:|
| 1 | Isopropyl alcohol | 5 |
| 2 | Tri(2-methyl-1-aziridinyl)phosphine oxide | 0 |
| 3 | Isopropyl alcohol | 5 |
| 4 | Tri(2-methyl-1-aziridinyl)phosphine sulfide | 0 |

The polymer color ratings are designated by number, with 5 representing the color of a normal control sample, i.e., dark yellow or amber, obtained when the polymerization is shortstopped with isopropyl alcohol. The product has the same color when water or rosin acid is used as the shortstopping agent. A rating of zero indicates that the polymer was substantially colorless. It can thus be seen that a significant improvement in the color of the polymer is obtained through the use of aziridinyl compounds as shortstopping agents.

As will be evident to those skilled in the art, many variations and modifications of the invention can be practiced in view of the foregoing disclosure. Such variations and modifications are believed to come within the spirit and scope of the invention.

I claim:
1. In a process for polymerizing 1,3-butadiene with an organo-metallic catalyst system containing iodine and formed by mixing at least two components, one of which is a titanium halide and another is an organometal compound of a metal selected from the group consisting of beryllium, magnesium, zinc, cadmium, mercury, aluminum, gallium, indium, thallium and lead, the improvement which comprises shortstopping the polymerization by adding to the polymerization mixture a compound selected from the group consisting of aziridinyl phosphine oxides and aziridinyl phosphine sulfides containing at least one aziridinyl group having the formula:

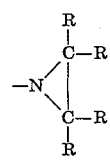

wherein each R is selected from the group consisting of hydrogen, alkyl, aryl, and cycloalkyl radicals, and composites thereof, the total of said R groups containing up to and including 20 carbon atoms.

2. In a process for polymerizing 1,3-butadiene with an iodine-containing catalyst system which forms on mixing at least two components, one of which is a titanium halide and another is an organometal compound of a metal selected from the group consisting of beryllium, magnesium, zinc, cadmium, mercury, aluminum, gallium, indium, thallium and lead, the improvement which comprises shortstopping the polymerization by adding to the polymerization mixture a compound selected from the group consisting of aziridinyl phosphine oxides and aziridinyl phosphine sulfides containing a least one aziridinyl group having the formula:

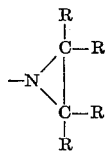

wherein each R is selected from the group consisting of hydrogen, alkyl, aryl, and cycloalkyl radicals, and composites thereof, the total of said R groups containing up to 20 carbon atoms, the amount of said compound being in the range of 0.1 to 1 part by weight per 100 parts by weight of polymer; and recovering the butadiene polymer from said polymerization mixture.

3. The process of claim 2 in which said compound is tri(2-methyl-1-aziridinyl)phosphine oxide.

4. The process of claim 2 in which said compound is tri(2-methyl-1-aziridinyl)phosphine sulfide.

5. The process of claim 2 in which said compound is tri(1-aziridinyl)phosphine oxide.

6. The process of claim 2 in which said compound is tri(2,2-dimethyl-1-aziridinyl)phosphine sulfide.

7. The process of claim 2 in which said compound is tri(2-phenyl-1-aziridinyl)phosphine oxide.

References Cited by the Examiner
UNITED STATES PATENTS
3,076,795  2/63  Hall _____ 260—94.7

FOREIGN PATENTS
1,215,953  11/59  France.
841,290  7/60  Great Britain.

JOSEPH L. SCHOFER, *Primary Examiner.*